(12) United States Patent
Gupta et al.

(10) Patent No.: US 11,436,353 B2
(45) Date of Patent: Sep. 6, 2022

(54) MERGE UPDATES FOR KEY VALUE STORES

(71) Applicant: VMware, Inc., Palo Alto, CA (US)

(72) Inventors: Abhishek Gupta, Palo Alto, CA (US);
Richard P. Spillane, Palo Alto, CA (US); Kapil Chowksey, Palo Alto, CA (US); Rob Johnson, Palo Alto, CA (US); Wenguang Wang, Santa Clara, CA (US)

(73) Assignee: VMWARE, INC., Palo Alto, CA (US)

( * ) Notice: Subject to any disclaimer, the term of this patent is extended or adjusted under 35 U.S.C. 154(b) by 1008 days.

(21) Appl. No.: 15/703,706

(22) Filed: Sep. 13, 2017

(65) Prior Publication Data

US 2019/0080107 A1 Mar. 14, 2019

(51) Int. Cl.
| | |
|---|---|
| *G06F 21/62* | (2013.01) |
| *G06F 9/46* | (2006.01) |
| *G06F 16/22* | (2019.01) |
| *G06F 16/23* | (2019.01) |
| *G06F 16/21* | (2019.01) |

(52) U.S. Cl.
CPC .......... *G06F 21/6218* (2013.01); *G06F 9/466* (2013.01); *G06F 16/214* (2019.01); *G06F 16/2246* (2019.01); *G06F 16/2308* (2019.01); *G06F 21/6227* (2013.01)

(58) Field of Classification Search
CPC ............................. H04L 63/083; H04L 63/101
USPC .......................................................... 726/5
See application file for complete search history.

(56) References Cited

U.S. PATENT DOCUMENTS

| | | | | |
|---|---|---|---|---|
| 2001/0039002 | A1* | 11/2001 | Delehanty | G09B 7/02 434/350 |
| 2001/0047334 | A1* | 11/2001 | Nappe | G07F 7/08 705/41 |
| 2003/0055943 | A1* | 3/2003 | Kanai | G06F 3/067 709/223 |
| 2003/0163691 | A1* | 8/2003 | Johnson | H04L 29/06 713/168 |

(Continued)

FOREIGN PATENT DOCUMENTS

WO  WO-2009132108 A2 * 10/2009 ........... G06Q 20/389

OTHER PUBLICATIONS

"Hung-chih Yang, Ali Dasdan, Ruey-Lung Hsia, D.Stott Parker"/ "Map-Reduce-Merge: Simplified Relational Data Processing on Large Clusters"/ "Jun. 14, 2007"/ "SIGMOD'07"/"pp. 1029-1040" (Year: 2007).*

*Primary Examiner* — William J. Goodchild
(74) *Attorney, Agent, or Firm* — Patterson & Sheridan, LLP

(57) ABSTRACT

Embodiments of the present disclosure relate to techniques for performing a merge update for a database. In particular, certain embodiments of a method include generating a message comprising a first key and a first transaction associated with the first key, the first transaction indicating a transaction to perform other than for key-value pairs comprising the first key. The method further includes storing the message in a database. The method further includes merging the message with a first key-value pair stored in the database, the first-key value pair comprising the first key. The method further includes performing the first transaction based on merging the message with the first key-value pair.

22 Claims, 3 Drawing Sheets

(56) References Cited

U.S. PATENT DOCUMENTS

| | | | | |
|---|---|---|---|---|
| 2008/0162309 A1* | 7/2008 | Tardif | ............... | G06Q 40/12 |
| | | | | 707/999.1 |
| 2011/0238580 A1* | 9/2011 | Coppinger | ............ | G06Q 20/20 |
| | | | | 705/65 |
| 2012/0310882 A1* | 12/2012 | Werner | ............... | H04L 67/1095 |
| | | | | 707/624 |
| 2014/0304231 A1* | 10/2014 | Kamath | ............... | G06F 16/27 |
| | | | | 707/634 |
| 2016/0065370 A1* | 3/2016 | Le Saint | ............ | H04L 9/0891 |
| | | | | 713/155 |

* cited by examiner

MERGE UPDATES FOR KEY VALUE STORES

BACKGROUND

Write-optimized databases (e.g., Cassandra, LevelDB, RocksDB, TokuDB, Big Table, Hbase, etc.) are a type of database capable of performing fast updates to entries (e.g., records) in the database. For example, write-optimized databases can work by buffering updates to entries in the database to a first portion (e.g., fast, temporary, etc.) of a data structure of the database (e.g., a data structure may be the format (e.g., table, array, record, tree (e.g., $B^\varepsilon$-tree, LSM-tree, etc.), etc.) in which data is organized and stored in the database), and then later merging the buffered updates (e.g., in batches, individually, etc.) into a main data structure of the database. Such write-optimized databases may be able to perform random write operations more quickly than regular $B^+$-tree operations.

One of the more common operations performed in a database to update (e.g., modify) an entry is a read-modify-write, where a value of an entry in the database is read, the value is modified (e.g., perform an operation on the value), and the modified value is written back to the entry. However, such a read-modify-write (i.e., query-modify-insert) operation includes a read operation for reading an entry from the database, which may not be optimized and therefore the overall operation may not be performed quickly. In addition, when a page corresponding to a number of entries stored in memory is written out while only very few entries in the page are dirty, a large portion of disk write bandwidth may be consumed unnecessarily (e.g., referred to as Write Amplification), thereby decreasing system performance. Updates in write-optimized databases may be designed to be "blind-updates" where no read is performed in the update, and those updates are instead later merged to the rest of the key-value store. Accordingly, data structures in write-optimized databases may support an update procedure that may be referred to as a merge update (also referred to as a message update or upsert) where an entry is modified without needing to perform a read operation at the time up the update.

For example, a database may be implemented as a key-value store where an entry in the database is stored as a key-value pair. The key portion of the entry may include a key (e.g., an identifier, type information, etc.) associated with the entry. The value portion of the entry may be the actual data accessed using the key. The database may be configured so that different operations can be performed on the database using the key. For example, operations include querying for a value associated with a key, inserting (e.g., replacing) a value associated with a key, and deleting a value associated with a key. The database may include a main data structure or portion that stores the key-value pairs for the database.

The database may further support performing a merge update to entries in the database. For example, to perform a merge update to a key-value pair a message is created in a portion of the database that may be separate from the main data structure. The message includes the same key as the key-value pair. However, the message may not include a value in the same way that a key-value pair stored in the database includes a value corresponding to actual data accessed using the key. Rather, the message includes a payload indicating a delta (e.g., an operation or function such as delete, multiply, sum, replace, etc.) to apply to a value of a key-value pair with the same key as the message. For example, if a key-value pair includes a key of "A" and a value of "10", and a message includes the same key of "A" and a delta of "add 3", then the message would indicate to add "3" to the value "10" resulting in an updated value "13" being associated with key "A" in the database.

However, when the message is created, the delta indicated in the payload of the message may not be immediately applied to the key-value pair with the same key. Rather, the message can be written to the database without querying or reading the key-value pair. Therefore, the result of applying the delta to the value in the key-value pair may not be known at the time the message is created. In a write-optimized database, this can reduce the latency associated with a read-modify-write operation, by removing the need to perform the read in order to update an entry in the database. The delta in the message may be applied at a later time to the value of the key-value pair with the same key as the message. Application of the delta of the message to the value may be referred to as a merge or compaction of the message with the key-value pair. For example, many messages may be created with the same key and/or different keys for application to the same and/or different key-value pairs, respectively. The messages may be merged with the key-value pairs (e.g., individually or in batches) in any suitable order (e.g., last in first out, first in first out, etc.). In some cases, the order of operations in which messages are merged may matter, and so messages are merged with the key-value pairs in a particular order (e.g., a multiplication operation may need to be performed before an addition operation). Further, messages may be merged with each other into a single message (e.g., two multiplication operations may be merged into a single multiplication operation), which may be later merged with another message or the key-value pair. The merging of messages may occur along a path or pipeline for processing messages.

If a query operation is performed with respect to a key for which messages are stored in the database that are not yet merged with the corresponding key-value pair, the query operation may identify all the messages with the key, and apply the deltas of the messages to the key-value pair and return the resulting value. In a query operation, the delta message remains in the database, unlike a compaction, where the delta message is removed from the database after it is merged with the corresponding key-value pair.

Accordingly, write-optimized databases implementing merge update procedures may be used to implement efficient databases. Therefore, techniques for improving such write-optimized databases may be desirable.

DETAILED DESCRIPTION

Embodiments of the present disclosure provide a system for expanding on merge update procedures used for write-optimized databases. As discussed, the result of applying a delta of a message to a value in a key-value pair may not be known at the time the message is created. However, it may be desirable to perform certain actions based on the result of applying the delta of the message to the value. Accordingly, embodiments of the present disclosure relate to systems and methods for triggering and performing actions based on a result of a merge of a message including a key with a key-value pair including the key in a database. In certain embodiments described, the actions are triggered and performed only during a compaction of a message with a key-value pair. Similarly, however, in certain embodiments, the actions can be triggered and performed not only for a compaction, but also for a message that is identified as part of a query when the query meets one or more criteria.

Figure 1:
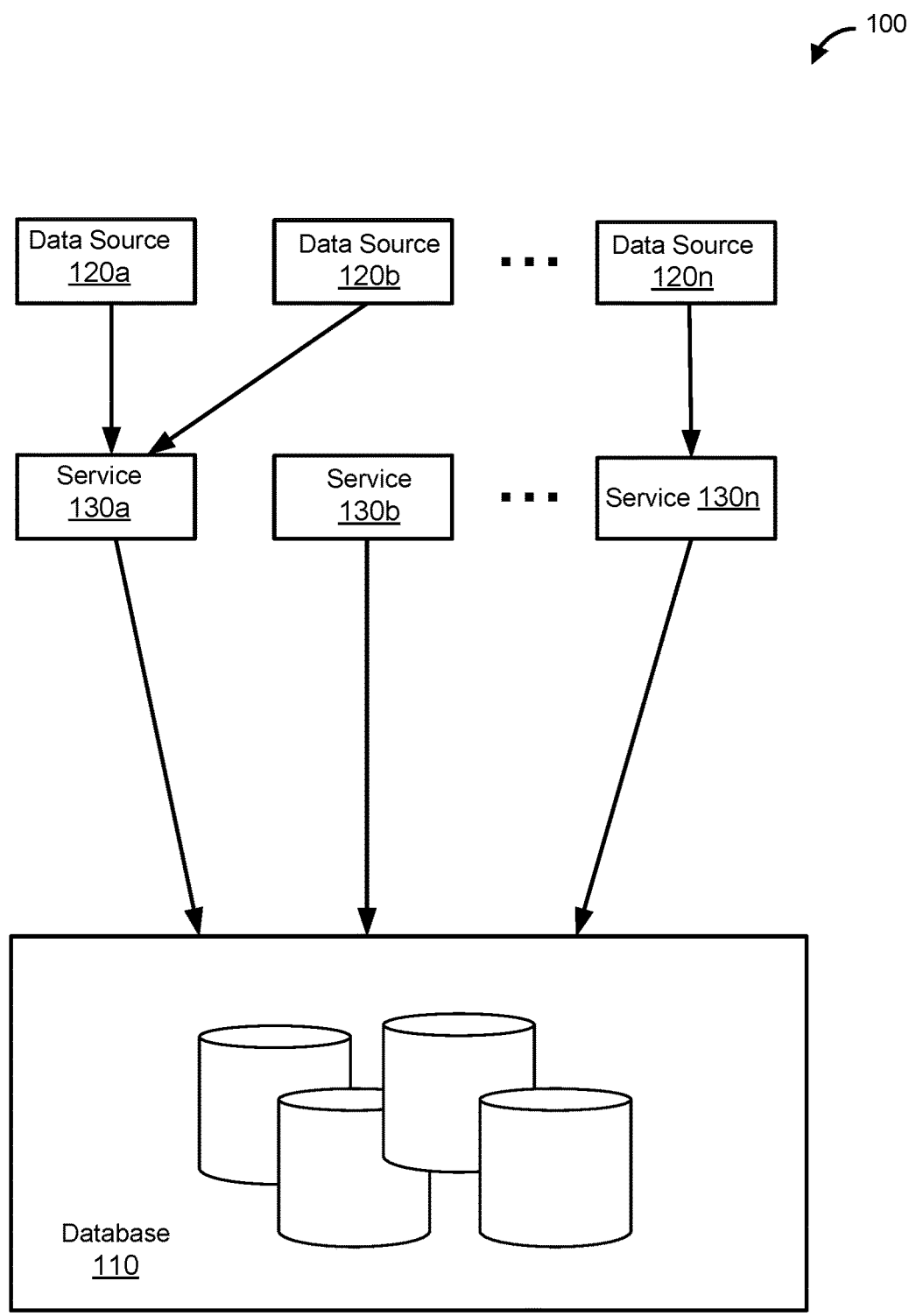
FIG. 1 illustrates components of an example system in which an embodiment may be implemented.

FIG. 1 illustrates components of a system 100 in which an embodiment may be implemented. As shown, system 100 includes a database 110, multiple data sources 120 (e.g., data sources 120a, 120b, . . . 120n), and multiple database management services 130 (e.g., database management services 130a, 130b, . . . 130n). Though multiple data sources 120 and multiple database management services 130 are shown, it should be noted that there may be any number of data sources or database management services in system 100.

Database 110 may include any suitable non-volatile data store for organizing and storing data from the multiple data sources 120. For example, in some embodiments, database 110 may be implemented as software-defined storage such as VMware Virtual SAN that clusters together server-attached hard disks and/or solid state drives (HDDs and/or SSDs), to create a flash-optimized, highly resilient shared datastore designed for virtual environments. In some embodiments, database 110 may be implemented as one or more storage devices, for example, one or more hard disks, flash memory modules, solid state disks, and optical disks (e.g., in a computing device, server, etc.). In some embodiments, database 110 may include a shared storage system having one or more storage arrays of any type such as a network-attached storage (NAS) or a block-based device over a storage area network (SAN). In some embodiments, database 110 is a write-optimized database. Further, database 110 may be implemented as a key-value store. Database 110 may store data from one or more data sources 120.

Each data source 120 may correspond to one or more physical devices (e.g., servers, computing devices, etc.) or virtual devices (e.g., virtual computing instances, containers, virtual machines (VMs), etc.). For example, a physical device may include hardware such as one or more central processing units, memory, storage, and physical network interface controllers (PNICs). A virtual device may be a device that represents a complete system with processors, memory, networking, storage, and/or BIOS, that runs on a physical device. For example, the physical device may execute a virtualization layer that abstracts processor, memory, storage, and/or networking resources of the physical device into one more virtual devices. Each data source 120 may generate data that is loaded into database 110.

Each database management service 130 may be a process or application executing on one or more physical devices or virtual devices. In certain embodiments, a database management service 130 may execute on the same device as a data source 120. In certain embodiments, a database management service 130 may execute on a separate device from the data source 120. As discussed, a database management service 130 may be an automatic service, or a manual service (e.g., directed by a human).

Each database management service 130 may be coupled (e.g., via a network, as running on the same device, etc.) to one or more data sources 120 and to the database 110 (e.g., via a network). Further, each database management service 130 may be configured to generate and perform operations on database 110. For example, a given database management service 130 may be configured to query for a value associated with a key stored in database 110, insert (e.g., replace) a value (e.g., from a data source 120) associated with a key in database 110, and delete a value associated with a key in database 110. In addition, a given database management service 130 may be configured to perform a merge update in database 110. In certain aspects, the query, insert, delete, and merge update operations may not be a linearly independent set of operations. For example, insert and delete operations may be implemented by performing a merge update operation. Rather, in certain embodiments, query, insert, delete, and merge update operations may be operations exposed by an application program interface (API) of database 110.

As discussed, for some merge updates a message is created including a key and a delta. When the message is merged with another message or key-value pair including the key, the delta may be applied to the other delta or value, respectively. However, such a merge update is limited in scope. Accordingly, certain embodiments herein relate to a merge update procedure wherein by database management service 130 generates a message for the update, where the message includes a key and instead of or in addition to a delta as described includes a transaction to be performed other than an operation on a value or delta associated with the same key. For example, the transaction may be performed by database management service 130 on another key-value pair in the same database 110 or a different database with a different key than that of the message. In another example, the transaction may be performed on another electronic device by database management service 130 instead of on the database 110.

In one example, the transaction may be to send a message (e.g., electronic message) to a destination (e.g., device, electronic account, etc.). In another example, the transaction may be a database operation, such as an insert, update, query, merge update, etc.

In certain embodiments, the message may include a key, a delta, and a transaction. In some such embodiments, database management service 130 may be configured to conditionally perform the transaction based on a resulting value from performing a merge between the delta of the message and a key-value pair with the same key as the message. For example, database 110 may be configured to store key-value pairs regarding user accounts, including a first key associated with a first value. The first key may be an account number, and a first value may be an account balance. A message for a merge update may include the first key, a delta indicating to subtract an amount from the first value, and a transaction indicating that if the first value after the merge is negative, to send a message or alert. Accordingly, if the first value minus the amount indicated in the delta results in a negative number (e.g., an account balance is negative) a message or alert is sent to a user or device.

In another example, database 110 may be configured to store reference counters as key-value pairs in one data structure and an allocation table that indicates whether certain data blocks in a storage are allocated or not for storage. For example, multiple devices/users may be configured to share data stored in a storage device (e.g., shared datastore). Database 110 may be configured to use reference counters that indicate how many devices/users are sharing/using particular data (e.g., a data block). In certain embodiments, a transaction in a message for a merge update may indicate that if a reference counter for data goes to 0, the allocation table should be updated to indicate the data is no longer allocated. This can beneficially free up data to be allocated for other purposes when it is no longer used. For example, each time a device/user is added as sharing the data, database management service 130 may perform a merge update using a message with a key corresponding to the data and a delta indicating to increase a value of the associated reference counter by 1. Each time a device/user is removed as sharing the data, database management service 130 may perform a merge update using a message with a key corresponding to the data and a delta indicating to decrease a value of the associated reference counter by 1 and a transaction that indicates if after the message is merged, the reference counter is 0, to updated the allocation table to indicate the data is no longer allocated.

In certain embodiments, a message includes a key and a transaction indicating that any key-value pairs including a timestamp value less than a timestamp value indicated in the transaction should be deleted. Accordingly, when the database management service 130 merges the message with a key-value pair or another message with the same key as in the message, a timestamp value associated with the key in the key-value pair or other message is checked, and if it is less than the timestamp value, the key-value pair or other message is discarded/deleted.

In certain embodiments, as discussed, messages for merge updates may be merged with key-value pairs in database 110 at different times. Certain embodiments relate to ensuring that a merge of a message in database 110 succeeds when it occurs. For example, performing a merge may result in data being inserted (e.g., deletes may be considered as a type of insert) into database 110. For such data to be inserted into database 110 successfully, database 110 needs sufficient space for the insert. Accordingly, in certain embodiments, each message indicates a maximum number of items that may be inserted in database 110 when the message is merged. In certain aspects, a message can only reserve as many inserts as there is free space in database 110 (minus any other reservations for other messages). In certain embodiments, a data structure may be maintained in database 110 indicating the maximum number of inserts that any pending messages (i.e., that have not been merged) have reserved. For example, in a log-structured merge-tree (LSM-tree), a sorted strings table (SSTable) may store the maximum number of inserts that would be incurred by merging the messages into the database (e.g., merging an SSTable with one or more other SSTables). As another example, in a $B^{\epsilon}$-tree, a pivot node in the tree may store the maximum number of inserts that would be incurred (e.g., by merging messages stored in the buffer portion or a sub-tree associated with the pivot node).

In certain aspects, if a message includes a transaction that triggers one or more inserts that further trigger one or more additional inserts (e.g., the one or more inserts are for inserting messages that when merged trigger one or more additional inserts), then the total possible inserts that may occur from all the merges may be reserved as the maximum number of inserts. In certain aspects, the merges may occur iteratively in a serial manner, where if a first set of inserts triggers a second set of inserts, the second set of inserts is completed while the first inserts is suspended and then resumed after the second set of inserts completes. If the triggering of inserts by a message causes a cascade where there is insufficient space in the database, all inserts may be aborted. For example, if a message reserves space for a first number of inserts, and one of the inserts from merging the message triggers a second number of inserts, the database 110 determines if there is sufficient space to reserve for additionally performing the second number of inserts, and then only performs the one of the inserts if there is sufficient space.

Figure 2:
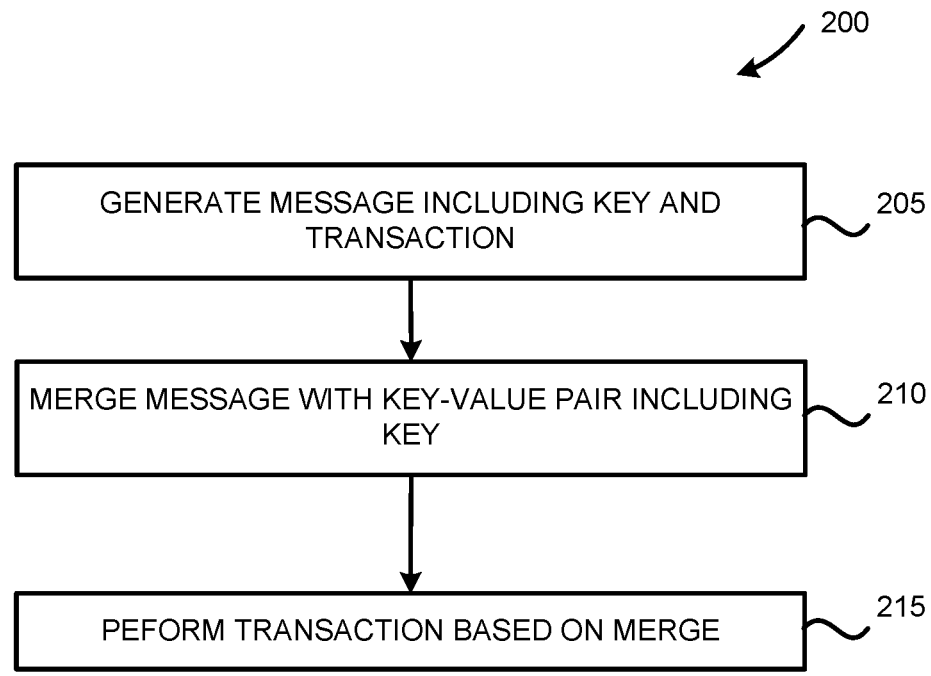
FIG. 2 illustrates example operations for performing merge updates of a database, in accordance with some embodiments.

FIG. 2 illustrates example operations 200 for performing merge updates of a database, in accordance with some embodiments.

At 205, database management service 130 generates a message including a key and a transaction to be performed other than an operation on a value or delta associated with the key. At 210, the database management service 130 merges the message with a key-value pair in database 110 with the same key as included in the message. At 215, based on the merge of the message and the key-value pair, database management service 130 performs the transaction.

Figure 3:
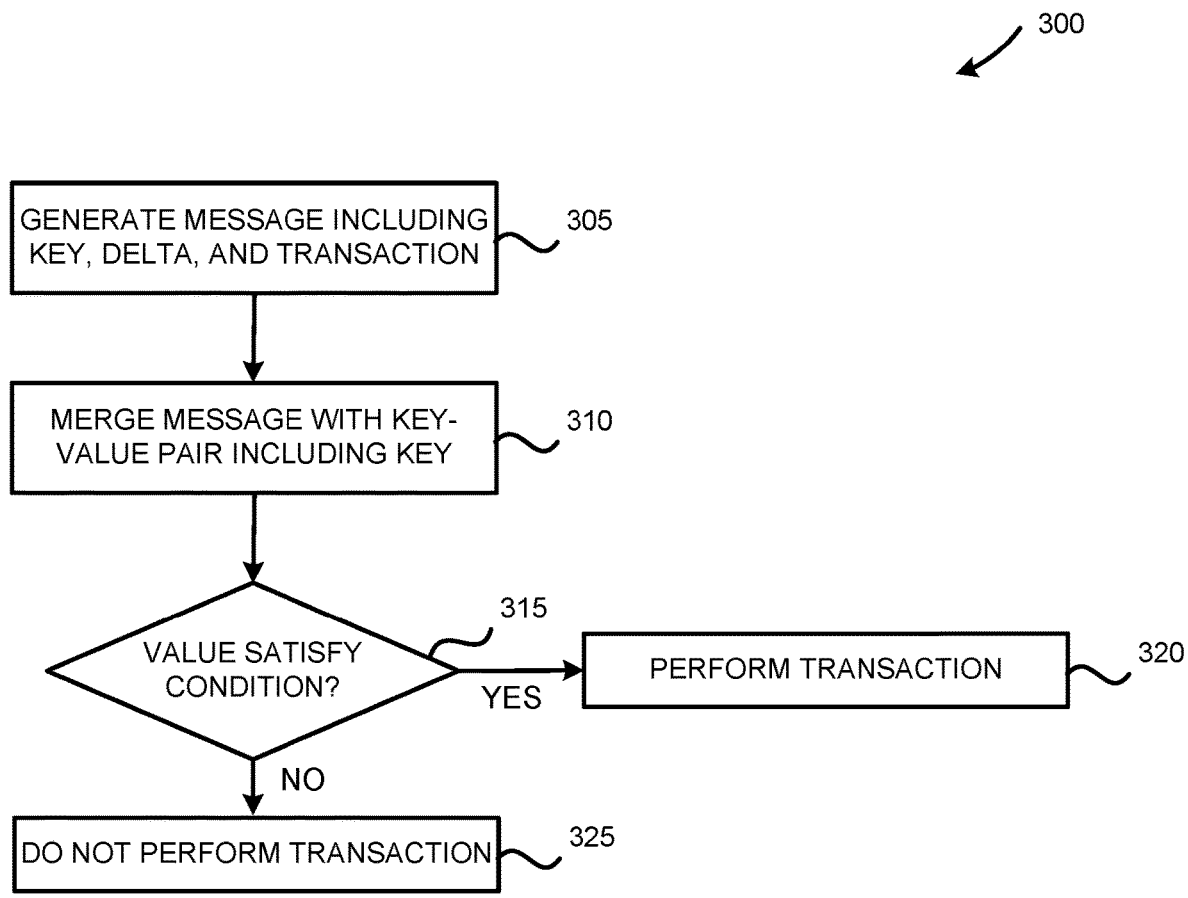
FIG. 3 illustrates example operations for performing merge updates of a database, in accordance with some embodiments.

FIG. 3 illustrates example operations 300 for performing merge updates of a database, in accordance with some embodiments.

At 305, database management service 130 generates a message including a key, a delta to be performed on a value of a key-value pair including the key, and a transaction to be performed based on the value of the key-value pair after a merge of the delta with the value. At 310, the database management service 130 merges the message with a key-value pair in database 110 with the same key as included in the message. At 315, database management service 130 determines if the updated value of the key-value pair satisfies a condition of the transaction. If at 315, it is determined that the updated value satisfies the condition, database management service 130 performs the transaction at 320. If at 315, it is determined that the updated value does not satisfy the condition, database management service 130 does not perform the transaction at 325. An example of the condition is a reference counter becoming 0, and the transaction being to free the space referenced by the key-value pair.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, VMs are used as an example for the virtual computing instances and hypervisors as an example for the hardware abstraction layer. As described above, each VM includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The computer readable media may be non-transitory. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, solid state disk (SSD or flash drive), network attached storage (NAS), read-only memory, random-access memory, NVM (non-volatile memory such as Phase Change Memory or 3D-xPoint memory), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for performing a merge update for a database, the method comprising:
   generating a message comprising an operation, a first key, and a first transaction associated with the first key, the first transaction indicating a transaction to perform other than for key-value pairs comprising the first key;
   storing the message in the database;
   merging the message with a first key-value pair stored in the database, the first-key value pair comprising the first key and a first value, wherein merging the message with the first key-value pair comprises performing the operation on the first value to generate an updated first value; and
   based on the updated first value satisfying a condition indicated in the first transaction, performing the first transaction.

2. The method of claim 1, wherein the first transaction comprises performing one or more inserts into at least one of the database or a second database, and further comprising:
   determining if there is sufficient space in the at least one of the database or the second database to perform the one or more inserts; and
   storing the message in the database when it is determined there is sufficient space in the at least one of the database or the second database to perform the one or more inserts.

3. The method of claim 2, wherein a first insert of the one or more inserts is configured to trigger one or more additional inserts in the at least one of the database or the second database, wherein determining if there is sufficient space in the at least one of the database or the second database to perform the one or more inserts comprises determining if there is sufficient space in the at least one of the database or the second database to perform the one or more additional inserts.

4. The method of claim 2, wherein a first insert of the one or more inserts is configured to trigger one or more additional inserts in the at least one of the database or the second database, and further comprising:
   determining if there is sufficient space in the at least one of the database or second database to perform the one or more additional inserts; and aborting the first insert when there is not sufficient space in the at least one of the database or the second database to perform the one or more additional inserts.

5. The method of claim 1, wherein the transaction comprises another operation to perform on a value of a key-value pair comprising a key other than the first key.

6. The method of claim 5, wherein the key-value pair is stored in a second database.

7. The method of claim 1, wherein a first value of the first key-value pair comprises a reference counter for a first data, and wherein the transaction comprises updating an allocation table to indicate the first data is deallocated when the reference counter satisfies a condition.

8. The method of claim 1, wherein merging the message occurs at a different time than storing the message in the database.

9. The method of claim 1, wherein the database stores a plurality of key-value pairs, and further comprising:
receiving a query including the first key; and
returning, from the database, the first value in response to the query based on the query including the first key.

10. A non-transitory computer readable medium comprising instructions to be executed in a computer system, wherein the instructions, when executed in the computer system, cause the computer system to:
generate a message comprising an operation, a first key, and a first transaction associated with the first key, the first transaction indicating a transaction to perform other than for key-value pairs comprising the first key;
store the message in a database;
merge the message with a first key-value pair stored in the database, the first key-value pair comprising the first key and a first value, wherein merging the message with the first key-value pair comprises performing the operation on the first value to generate an updated first value; and
based on the updated first value satisfying a condition indicated in the first transaction, performing the first transaction.

11. The non-transitory computer readable medium of claim 10, wherein the first transaction comprises performing one or more inserts into at least one of the database or a second database, and wherein the instructions, when executed in the computer system, further cause the computer system to:
determine if there is sufficient space in the at least one of the database or the second database to perform the one or more inserts; and
store the message in the database when it is determined there is sufficient space in the at least one of the database or the second database to perform the one or more inserts.

12. The non-transitory computer readable medium of claim 11, wherein a first insert of the one or more inserts is configured to trigger one or more additional inserts in the at least one of the database or the second database, wherein determining if there is sufficient space in the at least one of the database or the second database to perform the one or more inserts comprises determining if there is sufficient space in the at least one of the database or the second database to perform the one or more additional inserts.

13. The non-transitory computer readable medium of claim 11, wherein a first insert of the one or more inserts is configured to trigger one or more additional inserts in the at least one of the database or the second database, and wherein the instructions, when executed in the computer system, further cause the computer system to:
determine if there is sufficient space in the at least one of the database or the second database to perform the one or more additional inserts; and
abort the first insert when there is not sufficient space in the at least one of the database or the second database to perform the one or more additional inserts.

14. The non-transitory computer readable medium of claim 10, wherein the transaction comprises another operation to perform on a value of a key-value pair comprising a key other than the first key.

15. The non-transitory computer readable medium of claim 10, wherein the first value of the first key-value pair comprises a reference counter for a first data, and wherein the transaction comprises updating an allocation table to indicate the first data is deallocated when the reference counter satisfies the condition.

16. The non-transitory computer readable medium of claim 10, wherein merging the message occurs at a different time than storing the message in the database.

17. A computer system, comprising:
a memory; and
a processor coupled to the memory, the memory and the processor being configured to:
generate a message comprising an operation, a first key, and a first transaction associated with the first key, the first transaction indicating a transaction to perform other than for key-value pairs comprising the first key;
store the message in a database;
merge the message with a first key-value pair stored in the database, the first key-value pair comprising the first key and a first value, wherein to merge the message with the first key-value pair comprises to perform the operation on the first value to generate an updated first value; and
based on the updated first value satisfying a condition indicated in the first transaction, perform the first transaction.

18. The computer system of claim 17, wherein the first transaction comprises performing one or more inserts into at least one of the database or a second database, and wherein the memory and the processor are further configured to:
determine if there is sufficient space in the at least one of the database or the second database to perform the one or more inserts; and
store the message in the database when it is determined there is sufficient space in the at least one of the database or the second database to perform the one or more inserts.

19. The computer system of claim 18, wherein a first insert of the one or more inserts is configured to trigger one or more additional inserts in the at least one of the database or the second database, wherein determining if there is sufficient space in the at least one of the database or the second database to perform the one or more inserts comprises determining if there is sufficient space in the at least one of the database or the second database to perform the one or more additional inserts.

20. The computer system of claim 18, wherein a first insert of the one or more inserts is configured to trigger one or more additional inserts in the at least one of the database or the second database, and wherein the memory and the processor are further configured to:
determine if there is sufficient space in the at least one of the database or the second database to perform the one or more additional inserts; and abort the first insert when there is not sufficient space in the at least one of the database or the second database to perform the one or more additional inserts.

21. The computer system of claim 17, wherein the transaction comprises another operation to perform on a value of a key-value pair comprising a key other than the first key.

22. The computer system of claim 17, wherein merging the message occurs at a different time than storing the message in the database.

* * * * *